United States Patent Office 2,764,922
Patented Oct. 2, 1956

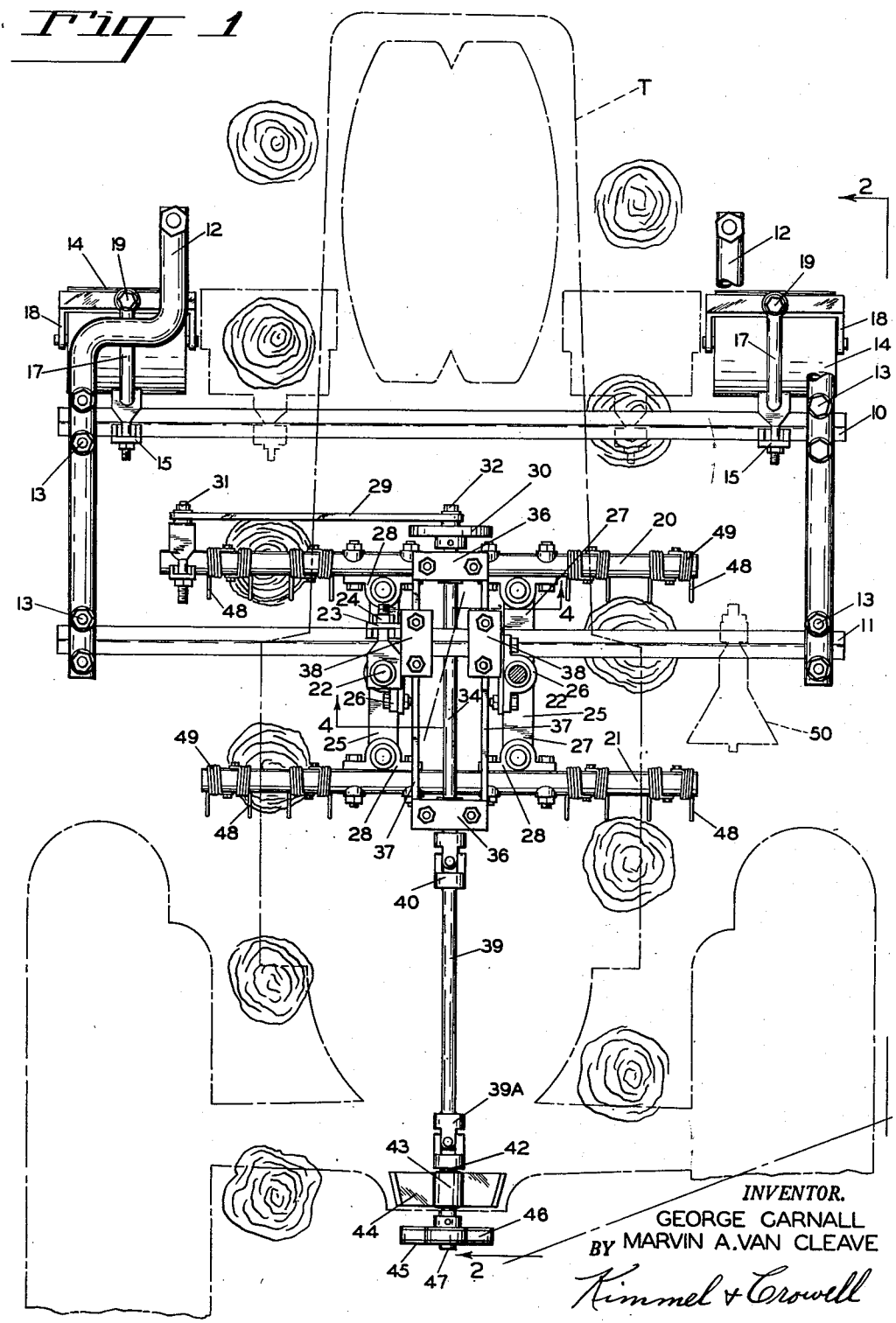

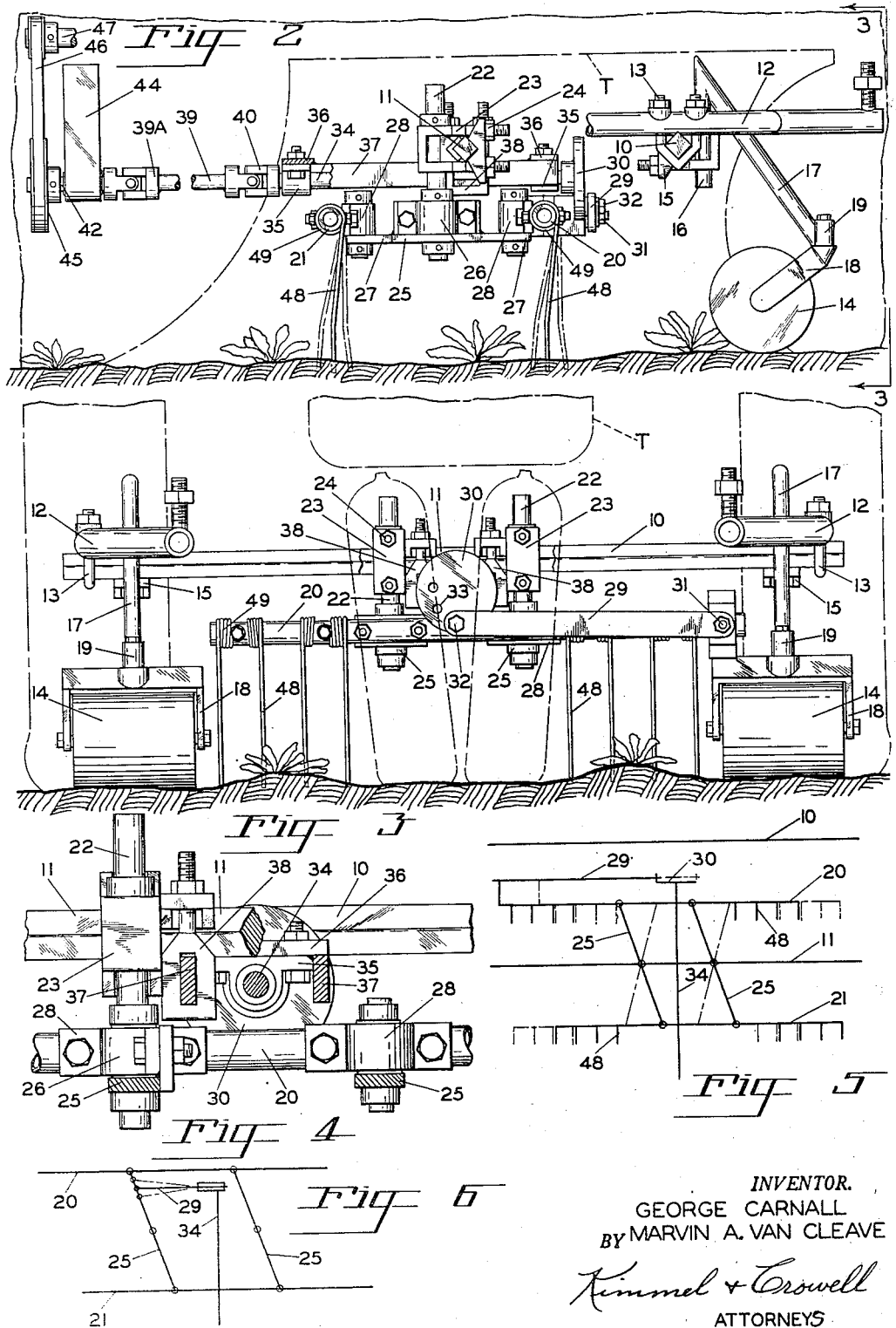

2,764,922

MECHANICAL WEEDERS

George Carnall, Metolius, and Marvin A. Van Cleave, Salem, Oreg., assignors to Van Cleave Farms, Salem, Oreg.

Application June 7, 1954, Serial No. 434,917

1 Claim. (Cl. 97—44)

Our invention relates to mechanical weeders, and is particularly adapted for the weeding of strawberry plants and other forms of plant crops.

The primary object of the invention is to design a mechanical weeder having resilient fingers or tines, which preferably operate transversely of the direction of travel. These teeth or tines efficiently remove the weeds, which are less securely rooted than the plants being cultivated, but in no way injure the plants.

Another object of the invention is to break up the upper crust of the soil, mulching the soil around the plants for better moisture control.

Another object of the invention is to level the soil around the plants.

Another object of the invention is to accomplish the results above stated by a simple mechanism, which is demountable or attachable to any type of power tractor.

Another object of the invention is to trim and plant the runners or plants in a desired direction, particularly strawberry plants.

Another object of the invention is to provide means of crushing the clods that exist.

These and other incidental objects will be apparent in the drawings, specification and claim.

Referring to the drawings:

Figure 1 is a plan view of our new and improved weeder shown in full lines, while the tractor is shown in broken lines.

Figure 2 is a side view of the weeder, taken on line 2—2 of Figure 1, illustrating parts of the tractor in broken lines.

Figure 3 is a front view of the weeder, taken on line 3—3 of Figure 2, looking in the direction indicated, parts of the tractor shown in broken lines.

Figure 4 is a fragmentary sectional view, taken on line 4—4 of Figure 1.

Figure 5 is a diagrammatical layout of the principle of operation.

Figure 6 shows another preferred form of drive for oscillating the fingers or tines.

Referring more specifically to the drawings:

Our invention consists of tool bars 10 and 11. These bars are connected to the tractor T by supporting arms 12, which are bolted to the said tool bars by the usual fittings, as U-bolts 13. We have not illustrated how the supporting arms 12 are connected to the tractor as there are a number of various methods of mounting these arms to the tractor, they are usually connected to a lifting mechanism not here shown, but which may vary in design and while we show the tool bars 10 and 11 mounted midway the tractor, they could be mounted to the rear, front or to one side of the tractor.

The tool bars 10 and 11 may be further supported by depth gauge rollers 14, which are part of our invention. These rollers are clamped by the clamps 15 to the tool bars 10 and 11, as best illustrated in Figures 1 and 2. A vertical stem 16 is adjustably clamped within the clamps 15 so that the same can be raised or lowered. An arm 17 forms part of the stem 16 and has the caster yoke 18 rotatably mounted thereto at 19. The object of the vertical adjustment of the same is to govern the depth of the fingers or tines, which will later be described.

Oscillating tool bars 20 and 21 are pivotally mounted to the tool bar 11, in the following manner. An adjustably mounted vertical shaft 22 is clamped to the tool bar 11 by way of the usual clamping mechanism 23. The clamp 23 is tightened to the tool bar 11 by the bolt 24, and as this bolt is tightened it holds the vertical shaft 22 in a fixed position. Rocker arms 25 are journalled to the lower ends of the vertical shafts 22 by bearings 26. The tool bars 20 and 21 are pivotally connected to the ends 27 of the rocker arms 25 by suitable bearings 28.

The rocker arms 25 and the tool bars 20 and 21 are oscillated by a connecting rod 29, which has one of its ends journalled to the crank disk 30, and its opposite end journalled or pivotally connected at 31 to the tool bar 20. The throw of the connecting rod can be altered by changing the position of the crank pin 32 within the receiving holes 33 of the disk 30. Any suitable method could be used on changing the throw of the connecting rod. In Fig. 6 we illustrate a modified structure for oscillating the bars 20 and 21.

The crank disk 30 is fixedly secured to the shaft 34. The shaft 34 is journalled within bearings 35. These bearings are mounted to the base plates 36, forming part of the bars 37. The bars 37 pass through the special clamps 38, which are mounted to the tool bar, thereby supporting the bar 37 rigidly to the said tool bar. The shaft 34 is connected to the drive shaft 39 by way of the universal joint 40 and the said drive shaft 39 is connected to a universal 39A, the said universal being part of the shaft 42, which is journalled within the bearing 43 of the hanger 44. The shaft 42 is driven by way of the driven pulley 45 by way of the V-belt 46, which in turn is connected to the power take off shaft 47 of the tractor. This is only one way of driving the shaft 34, there are many variations.

Fingers or tines 48 are fixedly secured to the oscillating tool bars 20 and 21 through the coils 49 and cap screws, which are bolted to the tool bars, as best illustrated in Figures 1, 2 and 3, and they are so mounted as to be relatively vertical while inactive, referring to Figure 2. The resilient mounting of these fingers or tines is important, whether they are of the structure illustrated or some other structure to permit them to move about their center lines and around the strawberry plants.

Referring to Figure 1, I have illustrated by broken lines a cultivator hoe mounted to the tool bar 11. All of the cultivator hoes could be mounted to the tool bars 10 and 11 to cultivate between the rows, although in many cases these cultivator hoes are mounted to a tool bar holding device located on the rear of the tractor. This is not part of our invention.

We will now describe the operation of our new and improved weeder. As the tractor moves forward slowly over the field, the power take off drives the shafts 39 and 34 oscillating the rocker arms 25 about the supporting bearings 26. This also moves the tool bars 20 and 21, together with the fingers or tines 48 transversely of the direction of the travel. The tines, when contacting the plants, will deflect around the plants due to the strength of the plant but the weeds will be pulled out due to their relatively weaker growth. As the tip of the fingers strike the plant and the tractor is going forward the tip will be held backward in regards to the plant and moved sidewise due to the transverse oscillation of the said fingers or tines.

In the operation of the weeder, the same should be used at the proper time, especially when the weeds are small and weak and the plants are relatively strong. The depth gauge roller 14 may be operated between the rows of plants or they may be operated directly over the plant as illustrated in the broken line position in Figure 1. The object of operating them over the plant is to crush lumps of soil that may exist. By operating the same over the plants, the plant is more firmly embedded within the soil. These rollers also operate as a depth gauge for the operation of the fingers or tines through the soil.

It is very important that the speed and the length of stroke of the fingers or tines can be adjusted to meet various weeding conditions. The forward speed of the weeder, the rate of oscillation of the fingers and the length of stroke of the said fingers can be varied at will. The depth of the fingers or tines will have definite effects on the operation of the machine. The depth of the fingers or tines is governed by the adjustment of the vertical shaft 22, referring to Figure 2. The depth of the fingers can also be governed by the adjustment of the rollers 14 in regards to the tool bars 10 and 11. The length of stroke, referring to Figure 3, is governed by the position of the crank pin 32 of the connecting rod 29 in relation to the crank disk 30.

The speed of oscillation can be governed by the power source in regards to the tractor, and the forward travel of the machine is governed by the gear changes of the tractor, although we would not wish to be limited to this because an entirely different hook-up of the fingers or tines may be used in regards to the power plant.

We do not wish to be limited to the exact structure of our weeder as disclosed in the drawings, as our invention consists of moving flexible fingers or tines transversely of the direction of travel through the plants, therefore these fingers or tines can be mounted in various different ways to various types of tractors, even to small garden tractors.

What is claimed is:

A mechanical weeder attachment for tractors comprising a pair of parallel transverse front and rear frame members, means connecting said members together, vertically adjustable support rollers carried by said front member, said rollers engaging the earth in advance of said frame members, a front tool carrying bar positioned between said members and parallel thereto, a rear tool carrying bar positioned to the rear of said rear member, a pair of spaced parallel links pivotally connected between said tool carrying bars, a pair of vertical shafts, means vertically adjustably securing said shafts to the rear frame member, means pivotally securing said links on the lower ends of said shafts, a plurality of laterally and longitudinally resilient weeding fingers secured to said tool carrying bars in dependent relation thereto, a bracket overlying each of said tool bars, means securing said bracket to said rear frame member, a bearing mounted in each end of said bracket, a drive shaft journaled in said bearings at right angles to said frame members, a crank wheel fixed to said shaft forwardly of said front tool carrying bar, said crank wheel having a multiplicity of throws varying in distance from the crank wheel center, a link pivotally connected between one of said throws on said crank wheel and the front tool carrying bar, said multiplicity of throws providing means whereby the lateral movement of said tool carrying bars may be adjusted, a second drive shaft positioned rearwardly of said first drive shaft and adapted to be driven by a power take-off on the tractor, and a universal joint connecting said first and second drive shafts.

References Cited in the file of this patent
UNITED STATES PATENTS

| 503,434 | Neal et al. | Aug. 15, 1893 |
| 826,137 | Balyeat | July 17, 1906 |
| 1,327,424 | Dupler | Jan. 6, 1920 |
| 1,602,034 | McConnell | Oct. 5, 1926 |
| 2,592,097 | Younger | Apr. 8, 1952 |
| 2,669,067 | Severance | Feb. 16, 1954 |